US010759242B2

(12) United States Patent
Shiraishi et al.

(10) Patent No.: US 10,759,242 B2
(45) Date of Patent: Sep. 1, 2020

(54) VEHICLE

(71) Applicant: MITSUBISHI HEAVY INDUSTRIES, LTD., Tokyo (JP)

(72) Inventors: Masahiro Shiraishi, Tokyo (JP); Go Tomatsu, Tokyo (JP); Takahiro Yamashina, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 184 days.

(21) Appl. No.: 16/067,769

(22) PCT Filed: Jan. 6, 2017

(86) PCT No.: PCT/JP2017/000326
§ 371 (c)(1),
(2) Date: Jul. 2, 2018

(87) PCT Pub. No.: WO2017/119502
PCT Pub. Date: Jul. 13, 2017

(65) Prior Publication Data
US 2019/0001769 A1 Jan. 3, 2019

(30) Foreign Application Priority Data
Jan. 8, 2016 (JP) .................. 2016-002183

(51) Int. Cl.
*B60W 10/02* (2006.01)
*B60W 10/04* (2006.01)
(Continued)

(52) U.S. Cl.
CPC ............ *B60F 3/0007* (2013.01); *B60F 3/003* (2013.01); *B60K 25/06* (2013.01); *B60W 10/04* (2013.01);
(Continued)

(58) Field of Classification Search
CPC ...... B60W 10/02; B60W 10/04; B60W 10/06; B60W 10/101; B60F 3/0007
See application file for complete search history.

(56) References Cited

U.S. PATENT DOCUMENTS 3,733,931 A * 5/1973 Nyman .................. F16H 47/04
477/69
4,494,621 A 1/1985 Nagata
(Continued)

FOREIGN PATENT DOCUMENTS

| JP | 58-43865 A | 3/1983 |
|---|---|---|
| JP | 2001-246965 A | 9/2001 |

(Continued)

OTHER PUBLICATIONS

International Preliminary Report on Patentability and Written Opinion of the International Searching Authority (Forms PCT/IB/338, PCT/IB373 and PCT/ISA/237) for International Application No. PCT/JP2017/000326, dated Jul. 19, 2018, with English translation.
(Continued)

*Primary Examiner* — Edwin A Young
(74) *Attorney, Agent, or Firm* — Birch, Stewart, Kolasch & Birch, LLP (57) ABSTRACT

A vehicle includes: a power source; a first drive device configured to be driven by an output of the power source; a second drive device configured to be driven by the output of the power source; a non-stage transmission device capable of continuously changing a rotation speed which is transmitted to an input shaft of the second drive device; a power distribution device coupled to an output shaft of the power source, coupled to an input shaft of the first drive device and an input shaft of the non-stage transmission device, and configured to be capable of distributing the output of the power source to the first drive device and the second drive device in a state where the output shaft of the power source
(Continued)

is coupled to the input shaft of the first drive device and the input shaft of the non-stage transmission device at respective predetermined fixed reduction ratios; a first instruction device configured to output a first instruction value related to a rotation speed of the input shaft of the first drive device; a second instruction device configured to output a second instruction value related to a torque of the input shaft of the second drive device; and a control device configured to be capable of controlling the output of the power source and a transmission ratio of the non-stage transmission device. The control device includes: an output control part configured to control an output of the power source in accordance with the first instruction value outputted from the first instruction device; and a transmission control part configured to control the transmission ratio of the non-stage transmission device in accordance with the second instruction value outputted from the second instruction device.

9 Claims, 7 Drawing Sheets

(51) Int. Cl.
*B60F 3/00* (2006.01)
*F16H 61/66* (2006.01)
*B60W 10/06* (2006.01)
*F02D 29/02* (2006.01)
*B60W 10/107* (2012.01)
*B63H 11/08* (2006.01)
*B60K 25/06* (2006.01)
*B60W 10/10* (2012.01)
*B63H 5/07* (2006.01)
*F16H 63/50* (2006.01)
*F16H 59/18* (2006.01)
*F16H 61/40* (2010.01)

(52) U.S. Cl.
CPC ............ *B60W 10/06* (2013.01); *B60W 10/10* (2013.01); *B60W 10/107* (2013.01); *B63H 5/07* (2013.01); *B63H 11/08* (2013.01); *F02D 29/02* (2013.01); *F16H 61/66* (2013.01); *F02D 2200/10* (2013.01); *F02D 2250/18* (2013.01); *F16H 59/18* (2013.01); *F16H 61/40* (2013.01); *F16H 63/50* (2013.01)

(56) References Cited

U.S. PATENT DOCUMENTS

| | | |
|---|---|---|
| 2004/0014371 A1 | 1/2004 | Gibbs |
| 2009/0004932 A1 | 1/2009 | Jeffery et al. |
| 2009/0137360 A1 | 5/2009 | Shibata et al. |
| 2014/0113766 A1* | 4/2014 | Yagyu ............... B60W 20/30 477/5 |
| 2014/0274553 A1* | 9/2014 | Munsell ............... B60K 6/48 477/5 |
| 2015/0094922 A1* | 4/2015 | Dix ..................... F16D 48/06 701/68 |
| 2015/0258867 A1 | 9/2015 | Aoki et al. |
| 2015/0274150 A1 | 10/2015 | Sato et al. |

FOREIGN PATENT DOCUMENTS

| | | |
|---|---|---|
| JP | 2004-507398 A | 3/2004 |
| JP | 2007-118721 A | 5/2007 |
| JP | 2008-525265 A | 7/2008 |
| JP | 2008-303999 A | 12/2008 |
| JP | 2010-179882 A | 8/2010 |
| JP | 2014-97742 A | 5/2014 |
| JP | 2014-108687 A | 6/2014 |
| JP | 2014-108688 A | 6/2014 |
| JP | 2014-108692 A | 6/2014 |
| JP | 2015-96341 A | 5/2015 |

OTHER PUBLICATIONS

International Search Report (Form PCT/ISA/210) for International Application No. PCT/JP2017/000326, dated Mar. 14, 2017.
Japanese Office Action effective Jul. 2, 2019 issued in the corresponding Japanese Application No. 2016-002183 with an English Machine Translation.

* cited by examiner

VEHICLE

TECHNICAL FIELD

The present disclosure relates to a vehicle including a power distribution device.

BACKGROUND ART

Typically, a vehicle including a power distribution device is known. A power distribution device distributes output from a power source to a plurality of drive devices. For instance, Patent Document 1 discloses an invention related to a vehicle in which output from an engine is divided by a power distribution device into two independent powers that are equal to each other, to rotate sprockets (drive devices) on the right side and the left side of the vehicle.

CITATION LIST

Patent Literature

Patent Document 1: JPS58-43865A

SUMMARY

Problems to be Solved

As in the vehicle disclosed in Patent Document 1, in the case of a power distribution device which divides power from an engine equally, the distribution ratio is fixed. Thus, it is difficult to distribute output from the engine appropriately as intended by a driver. Thus, in the case of a vehicle which distributes output from a power source to the first drive device and the second drive device, it is not possible to appropriately change the output to be distributed to the first drive device and the output to be distributed to the second drive device in accordance with the traveling state of the vehicle. Thus, for an amphibious vehicle which travels by distributing output from a power source to the first drive device (water jet) and the second drive device (drive wheel), it is difficult to perform a running operation in which the engine output is distributed flexibly in accordance with an operation state, such as landing on a rock or a reef from water by increasing the torque of drive wheel while maintaining a predetermined propelling force with a water jet.

The power distribution device could be configured to be have a variable distribution ratio in order to enable a driver to operate the drive devices as intended. However, in that case, the power distribution device and the control would be complex.

In view of the above, an object of at least one embodiment of the present invention is to provide a vehicle including a power distribution device which distributes output from a power source to a plurality of drive devices as intended by a driver, even though the output from the power source is distributed at a fixed reduction ratio, so that power required by each of the plurality of drive devices is supplied to each of the drive devices via the power distribution device.

Solution to the Problems (1) A vehicle according to at least one embodiment of the present invention includes: a power source; a first drive device configured to be driven by an output of the power source; a second drive device configured to be driven by the output of the power source; a non-stage transmission device capable of continuously changing a rotation speed which is transmitted to an input shaft of the second drive device; a power distribution device coupled to an output shaft of the power source, coupled to an input shaft of the first drive device and an input shaft of the non-stage transmission device, and configured to be capable of distributing the output of the power source to the first drive device and the second drive device in a state where the output shaft of the power source is coupled to the input shaft of the first drive device and the input shaft of the non-stage transmission device at respective predetermined fixed reduction ratios; a first instruction device configured to output a first instruction value related to a rotation speed of the input shaft of the first drive device; a second instruction device configured to output a second instruction value related to a torque of the input shaft of the second drive device; and a control device configured to be capable of controlling the output of the power source and a transmission ratio of the non-stage transmission device. The control device includes: an output control part configured to control an output of the power source in accordance with the first instruction value outputted from the first instruction device; and a transmission control part configured to control the transmission ratio of the non-stage transmission device in accordance with the second instruction value outputted from the second instruction device.

With the above configuration (1), a vehicle including a power distribution device which distributes the output from a power source to two drive devices for driving the vehicle includes instruction devices provided as two systems, including the first instruction device configured to output the first instruction value related to the rotation speed of the input shaft of the first drive device and the second instruction device configured to output the second instruction value related to the torque of the input shaft of the second drive device. The output of the power source is controlled so that the rotation speed of the input shaft of the first drive device becomes the rotation speed corresponding to the first instruction value, and the transmission ratio of the non-stage transmission device is controlled so that the torque of the input shaft of the second drive device becomes the torque corresponding to the second instruction value. Herein, the power distribution device is configured to distribute the output power of the power source to the first drive device and the second drive device in a state where the reduction ratio between the output shaft of the power source and each of the input shaft of the first drive shaft and the input shaft of the non-stage transmission device is fixed at a predetermined reduction ratio.

Thus, in a case where the second instruction device is operated to control (increase) the transmission ratio of the non-stage transmission device while a predetermined first instruction value is outputted from the first instruction device, if the rotation speed of the input shaft of the non-stage transmission device accordingly changes (decreases), the rotation speed of the input shaft of the first drive device coupled to the input shaft of the non-stage transmission via the power distribution device might also change (decrease). Even in this case, the output of the power source is controlled so that the rotation speed of the input shaft of the first drive device becomes the rotation speed corresponding to the first instruction value, and thereby the output of the power source changes (increases) to cover the change (decrease) in the rotation speed of the input shaft of the first drive device, while the change (increase) in the output of the power source is transmitted to the second drive device via the non-stage transmission device as a torque (traction) corresponding to the second instruction value.

As described above, with the above configuration (1), it is possible to distribute the output from the power source appropriately to the first drive device and the second drive device in accordance with the respective instruction values from the two systems of instruction devices.

(2) In some embodiments, in the above configuration (1), the vehicle further includes a rotation speed detection device capable of detecting an actual rotation speed of the input shaft of the first drive device. The control device is configured to control the output of the power source so that the actual rotation speed detected by the rotation speed detection device becomes equal to a demand rotation speed corresponding to the first instruction value outputted from the first instruction device.

With the above configuration (2), the output of the power source is controlled in accordance with the feedback of the actual rotation speed from the rotation speed detection device, and thus it is possible to drive the first drive device so as to follow the demand rotation speed.

(3) In some embodiments, in the above configuration (1) or (2), the vehicle further includes a torque detection device capable of detecting an actual torque of the input shaft of the second drive device. The control device is configured to control a transmission ratio of the non-stage transmission device so that the actual torque detected by the torque detection device becomes equal to a demand torque corresponding to the second instruction value outputted from the second instruction device.

With the above configuration (3), the transmission ratio of the non-stage transmission device is controlled in accordance with the feedback of the actual torque from the torque detection device, and thus it is possible to drive the second drive device so as to follow the demand torque.

(4) In some embodiments, in the above configuration (3), the control device has a torque map including a relationship between the demand torque and the second instruction value outputted from the second instruction device associated with each other, and is configured to obtain the demand torque corresponding to the second instruction value on the basis of the torque map.

With the above configuration (4), it is possible to associate the second instruction value with the demand torque in the torque map, and thus it is possible to generate a desired torque corresponding to the operation amount at the second drive device.

(5) In some embodiments, in any one of the above configurations (1) to (4), the vehicle further includes a clutch device disposed on the input shaft of the non-stage transmission device and configured to be capable of connecting and shutting off power transmission between the power distribution device and the non-stage transmission device. The clutch device is configured to: operate so as to shut off the power transmission between the power distribution device and the non-stage transmission device if the second instruction value outputted from the second instruction device is not greater than a predetermined value, and operate so as to connect the power transmission between the power distribution device and the non-stage transmission device if the second instruction value outputted from the second instruction device is greater than the predetermined value.

With the above configuration (5), power transmission is connected between the power distribution device and the non-stage transmission device only if the second instruction value is greater than a predetermined value. If the second instruction value is not greater than a predetermined value, power transmission is shut off between the power distribution device and the non-stage transmission device, and the entire output of the power source is transmitted to the first drive device. Thus, it is possible to prevent transmission of a predetermined power to the second drive device when the demand torque of the second drive device is zero, for instance, and thereby it is possible to make effective use of the output of the power source, such as improving fuel consumption, for instance.

(6) In some embodiments, in any one of the above configurations (1) to (5), the first drive device and the second drive device each comprise a drive device for applying a propelling force to the vehicle.

With the above configuration (6), one of the above configurations (1) to (5) is applied to a vehicle including a plurality of drive devices including the first drive device and the second drive device, such as an amphibious vehicle, a disaster vehicle, and a construction vehicle.

(7) In some embodiments, in the above configuration (6), the first drive device comprises a water propelling device configured to apply a propelling force to the vehicle on water. The second drive device comprises a drive wheel configured to rotate while being in contact with ground to apply a propelling force to the vehicle.

With the above configuration (7), provided is an amphibious vehicle having two drive devices, a water propelling device and a drive wheel, as drive devices for applying a drive force to the vehicle. Thus, even on a landscape which is typically difficult to land on, such as rocks and reefs, it is possible to drive the vehicle to get over a rock or a reef by operating the second instruction device to increase the torque (traction) of the drive wheel gradually, while pushing the vehicle against the rock or reef with a predetermined propelling force with the water propelling device by operating the first instruction device.

(8) In some embodiments, in any one of the above configurations (1) to (7), the vehicle further includes: a third drive device configured to be driven by the output of the power source; a second non-stage transmission device capable of continuously changing a rotation speed which is transmitted to an input shaft of the third drive device; and a third instruction device configured to output a third instruction value related to a rotation speed of the input shaft of the third drive device. The power distribution device is coupled to the output shaft of the power source, coupled to the input shaft of the first drive shaft, the input shaft of the non-stage transmission device, and the input shaft of the third drive device, and configured to be capable of distributing the output of the power source to the first drive device, the second drive device, and the third drive device in a state where the output shaft of the power source is coupled to the input shaft of the first drive device, the input shaft of the non-stage transmission device, and the input shaft of the third drive device at respective predetermined fixed reduction ratios. The control device further includes a second transmission control part configured to control a transmission ratio of the second non-stage transmission device in accordance with the third instruction value outputted from the third instruction device.

With the above configuration (8), even for a vehicle including three or more drive devices, power required for each of the plurality of drive devices can be supplied individually via the power distribution device.

(9) In some embodiments, in the above configuration (8), at least one of the first drive device, the second drive device, or the third drive device comprises a loading device configured to be capable of lifting and lowering a load, or a loading platform device configured to be capable of tilting or rotating a loading platform or a mixing drum mounted to the vehicle.

With the above configuration (9), it is possible to supply sufficient power to a loading device or a loading platform device.

Advantageous Effects

According to at least one embodiment of the present invention, it is possible to provide a vehicle including a power distribution device which distributes output from a power source to a plurality of drive devices as intended by a driver, even though the output from the power source is distributed at a fixed reduction ratio, so that power required by each of the plurality of drive devices is supplied to each of the drive devices via the power distribution device.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of an equal state such as "same" "equal" and "uniform" shall not be construed as indicating only the state in which the feature is strictly equal, but also includes a state in which there is a tolerance or a difference that can still achieve the same function.

On the other hand, an expression such as "comprise", "include", "have", "contain" and "constitute" are not intended to be exclusive of other components.

Figure 1:
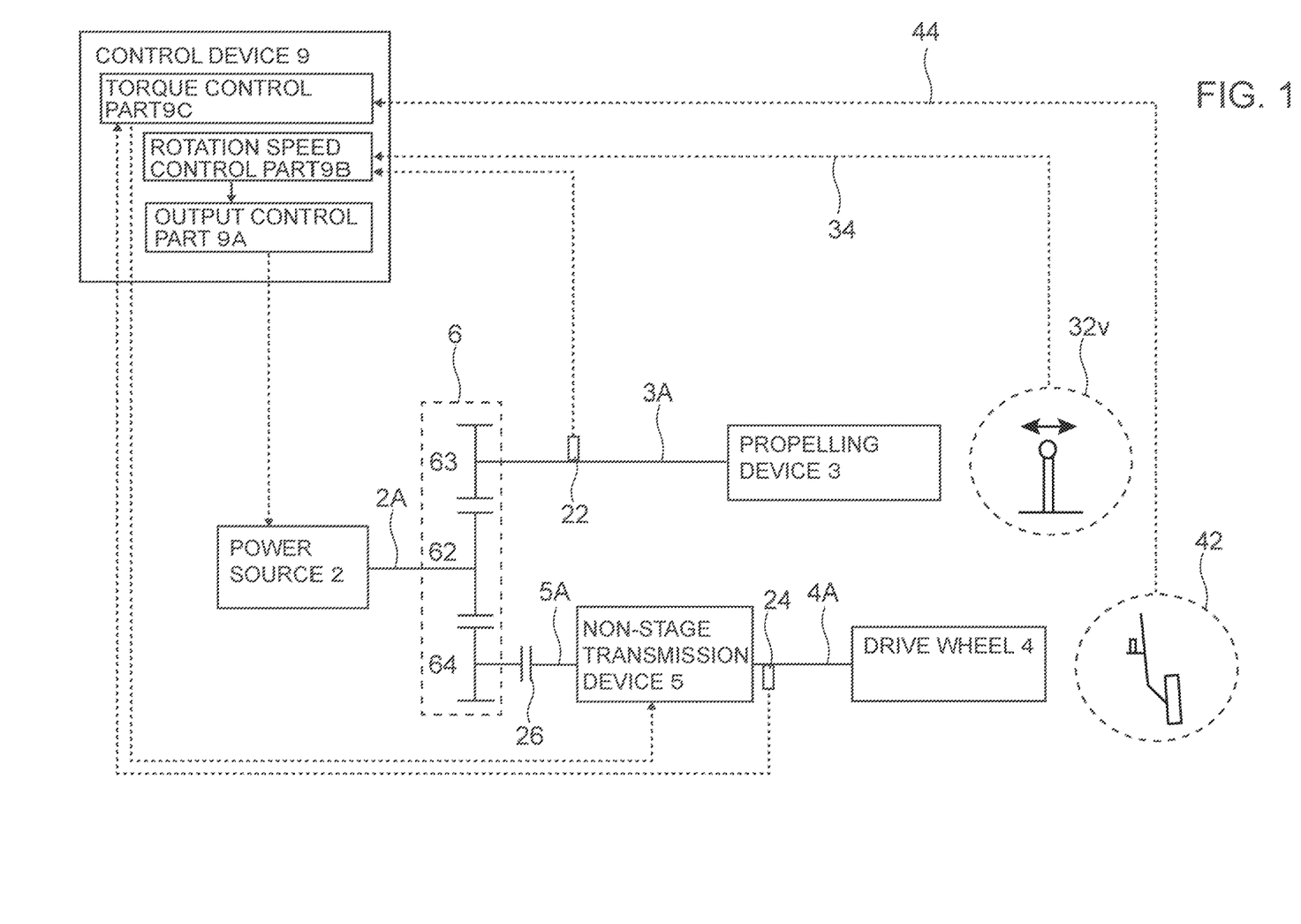
FIG. 1 is a schematic configuration diagram of a vehicle according to an embodiment of the present invention.
Figure 2:
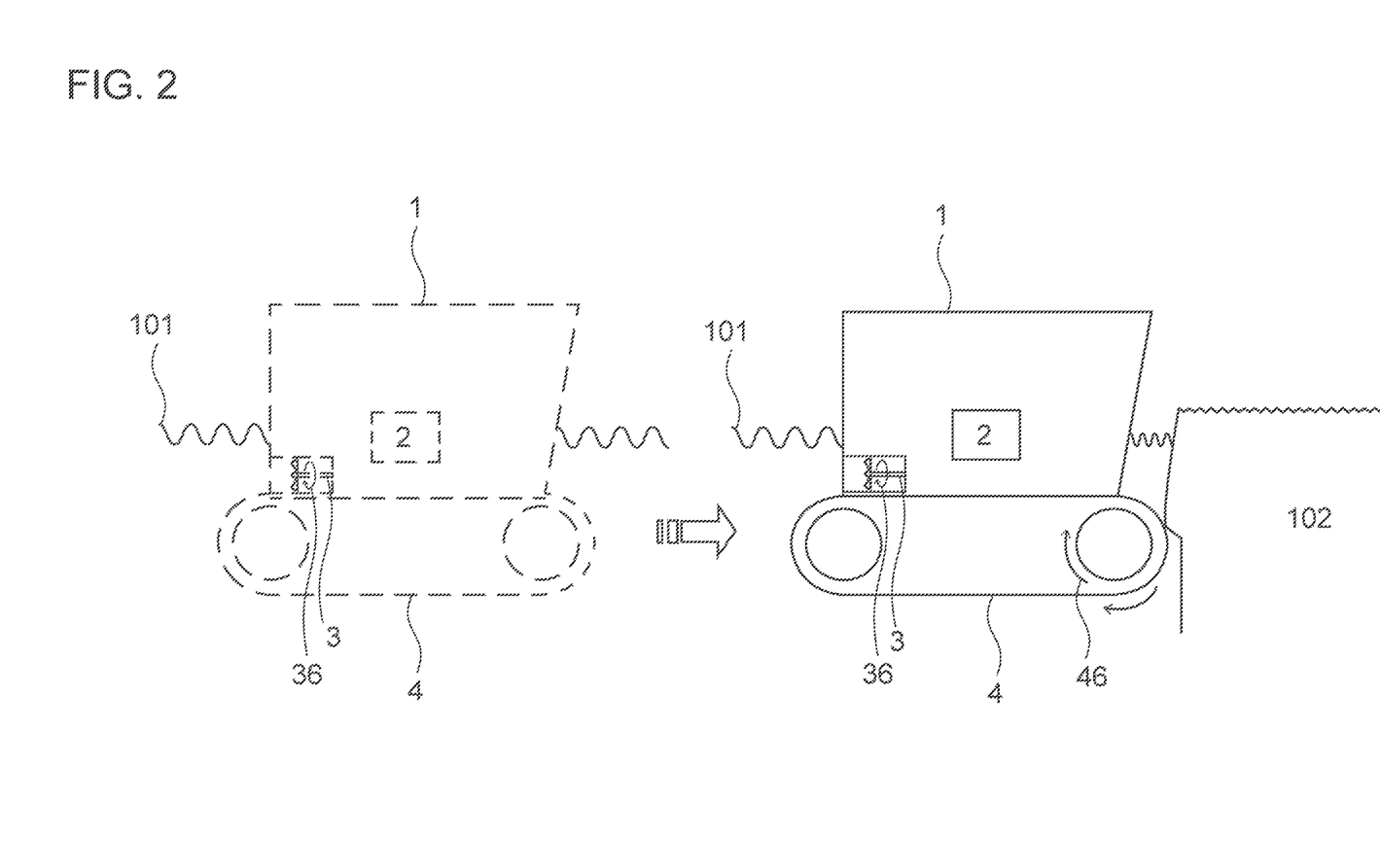
FIG. 2 is a diagram for describing a situation in which a vehicle according to an embodiment of the present invention is traveling on water and is about to land from a reef.

FIG. 1 is a schematic cross-sectional configuration diagram of a vehicle 1 according to an embodiment of the present invention. FIG. 2 is a diagram for describing a situation in which the vehicle 1 according to an embodiment of the present invention is traveling on water and is about to land from a reef 102. The vehicle 1 shown in FIGS. 1 and 2 is an amphibious vehicle 1. The vehicle 1 includes a power source 2, a first drive device 3, and a second drive device 4. The first drive device 3 and the second drive device 4 serve as drive devices of the vehicle 1. In FIGS. 1 and 2, the first drive device 3 is shown as a propelling device 3 which is a water jet or a propeller, for instance, and the second drive device 4 is shown as a drive wheel 4, which is a crawler belt or wheels. The propelling device 3 applies a propelling force to the vehicle 1 on water. Furthermore, as the drive wheel 4 rotates while being in contact with the ground, a propelling force is applied to the vehicle 1.

The output from the power source 2 is transmitted to the propelling device 3 and the drive wheel 4 by the power transmission device, and each drive device is driven by the output from the power source 2. As the power transmission device, the vehicle 1 includes a non-stage transmission device 5, a power distribution device 6, and a plurality of drive shafts (2A, 3A, 4A, 5A) (see FIG. 1). Furthermore, the vehicle 1 includes a throttle lever 32 for the propelling device 3, an accelerator pedal 42 for the drive wheel 4, and a control device 9, which control the vehicle 1 (see FIG. 1).

The power source 2 is an engine such as an internal combustion engine. The power source 2 produces thermal energy through combustion of fuel and air, and the thermal energy is extracted as kinetic energy (output) which rotates the output shaft 2A coupled to the power source 2. The output from the power source 2 drives the propelling device 3 and the drive wheel 4. Specifically, rotation of the output shaft 2A of the power source 2 is transmitted to the input shaft 3A of the propelling device 3 and the input shaft 4A of the drive wheel 4 via the power distribution device 6 described below, and thereby each drive device is driven.

The power distribution device 6 divides output from the power source 2 and transmits the power to each drive device. Specifically, the power distribution device 6 is coupled to the output shaft 2A of the power source 2, and is also coupled to each of the input shaft 3A of the propelling device 3 and the input shaft 5A of the non-stage transmission device 5, to transmit output transmitted from the power source 2 to each drive device. Furthermore, for the power distribution device 6, the output shaft 2A of the power source 2 is coupled to each of the input shafts 3A, 5A of the respective drive devices in a state of being fixed at a predetermined reduction ratio. By this coupling, the propelling device 3 is driven in accordance with the output (input) distributed to the input shaft 3A, and propels the vehicle 1 on water. Furthermore, the output distributed toward the drive wheel 4 is transmitted to the non-stage transmission device 5 through the input shaft 5A coupled to the power distribution device 6, and then transmitted to the drive wheel 4 through the input shaft 4A coupled to the non-stage transmission, to drive the drive wheel 4.

The above power distribution device 6 includes, for instance a gear 62 (the number of teeth is C2) which is disposed on the output shaft 2A of the power distribution device 6 and which rotates together with the output shaft 2A, and the like. The gear 62 may be coupled to a gear 63 (the number of teeth is C3) which is disposed on the input shaft 3A of the propelling device 3 and which rotates together with the input shaft 3A, and also to a gear 64 (the number of teeth is C4) which is disposed on the input shaft 5A of the non-stage transmission device 5 and which rotates together with the input shaft 5A. Instead of the gears, a known power transmitting member may be provided.

The non-stage transmission device 5 is a device capable of continuously changing the speed of rotation that is transmitted to the input shaft 4A of the drive wheel 4, and controls the torque of the drive wheel 4 in accordance with instruction. That is, the vehicle 1 is configured to be capable of instructing the torque of the drive wheel 4 (input shaft 4A of the drive wheel 4) in accordance with the operation amount of the accelerator pedal 42 in a particular operational condition (operation environment). Further, as an instruction (the second instruction value 44) from the accelerator pedal 42 is input to the control device 9 (described below), the control device 9 controls the non-stage transmission 5 so that the torque corresponding to the instruction value (the second instruction value 44) is generated at the drive wheel 4. For instance, the non-stage transmission device 5 is controlled so that the torque increases (after transmission, the rotation speed decreases) if a larger torque is required by the second instruction value 44, and so that the torque decreases (after transmission, the rotation speed increases) if a smaller torque is required.

The non-stage transmission device 5 may be a known transmission, such as a hydraulic mechanism transmission (HMT), a hydraulic static transmission (HST), and a continuously variable transmission (CTV).

Furthermore, the vehicle 1 is also capable of instructing the output of the propelling device 3 with an operation amount of the throttle lever 32. In response to an instruction (first control value) from the throttle lever 32 input to the control device 9, the control device 9 controls the output of the power source 2 so that the propelling device 3 (input shaft 3A of the propelling device 3) rotates at a rotation speed corresponding to the instruction value (first instruction value 34). For instance, the output of the power source 2 is increased so that the rotation speed increases if a higher rotation speed is required by the first instruction value 34, and is decreased so that the rotation speed decreases if a lower rotation speed is required.

The control device 9 controls the power source 2 on the basis of the first instruction value 34 from the throttle lever 32 and the second instruction value 44 from the accelerator pedal 42 which are input as described above. Thus, the control device 9 includes an output control part 9A for controlling the output of the power source 2, a rotation-speed control part 9B, and a torque control part 9C. The control device 9 may be an electronic control unit (ECU).

The output control part 9A controls the output of the power source 2 on the basis of an instruction from the rotation speed control part 9B. The rotation speed control part 9B receives the first instruction value 34 outputted from the throttle lever 32, determines a control parameter related to the output of the power source 2 on the basis of the first instruction value 34, and sends the above instruction to the output control part 9A. Furthermore, the torque control part 9C receives the second instruction value 44 outputted from the accelerator pedal 42, and determines a transmission ratio on the basis of the second instruction value 44, and instructs the non-stage transmission device 5, thereby controlling the transmission ratio of the non-stage transmission device 5. The control parameter related to the output of the power source 2 may include a fuel injection amount. Further, if the non-stage transmission device is a HST, the instruction to the non-stage transmission device 5 may be an instruction for changing the angle of the swash plate of the hydraulic pump.

With this configuration, power demanded for each of the plurality of drive devices is supplied to each of the drive devices via the power distribution device 6. Furthermore, both of the propelling device 3 and the drive wheel 4 can be driven in a specific operational condition, such as a case where the amphibious vehicle 1 traveling on water by using the propelling device 3 is about to make a landing. At this time, the output of the propelling device 3 is instructed by the first instruction value 34 corresponding to the operation amount of the throttle lever 32, and the torque of the drive wheel 4 is instructed by the second instruction value 44 corresponding to the operation amount of the accelerator pedal 42. These instructions are each input to the control device 9. Furthermore, the control device 9 controls the output of the power source 2 so that the input shaft 3A of the propelling device 3 rotates at a rotation speed corresponding to the first instruction value 34 of the throttle lever 32. Furthermore, the control device 9 controls the non-stage transmission device 5 so that a torque corresponding to the second instruction value 44 from the accelerator pedal 42 is generated at the input shaft 4A of the drive wheel 4.

Figure 3:
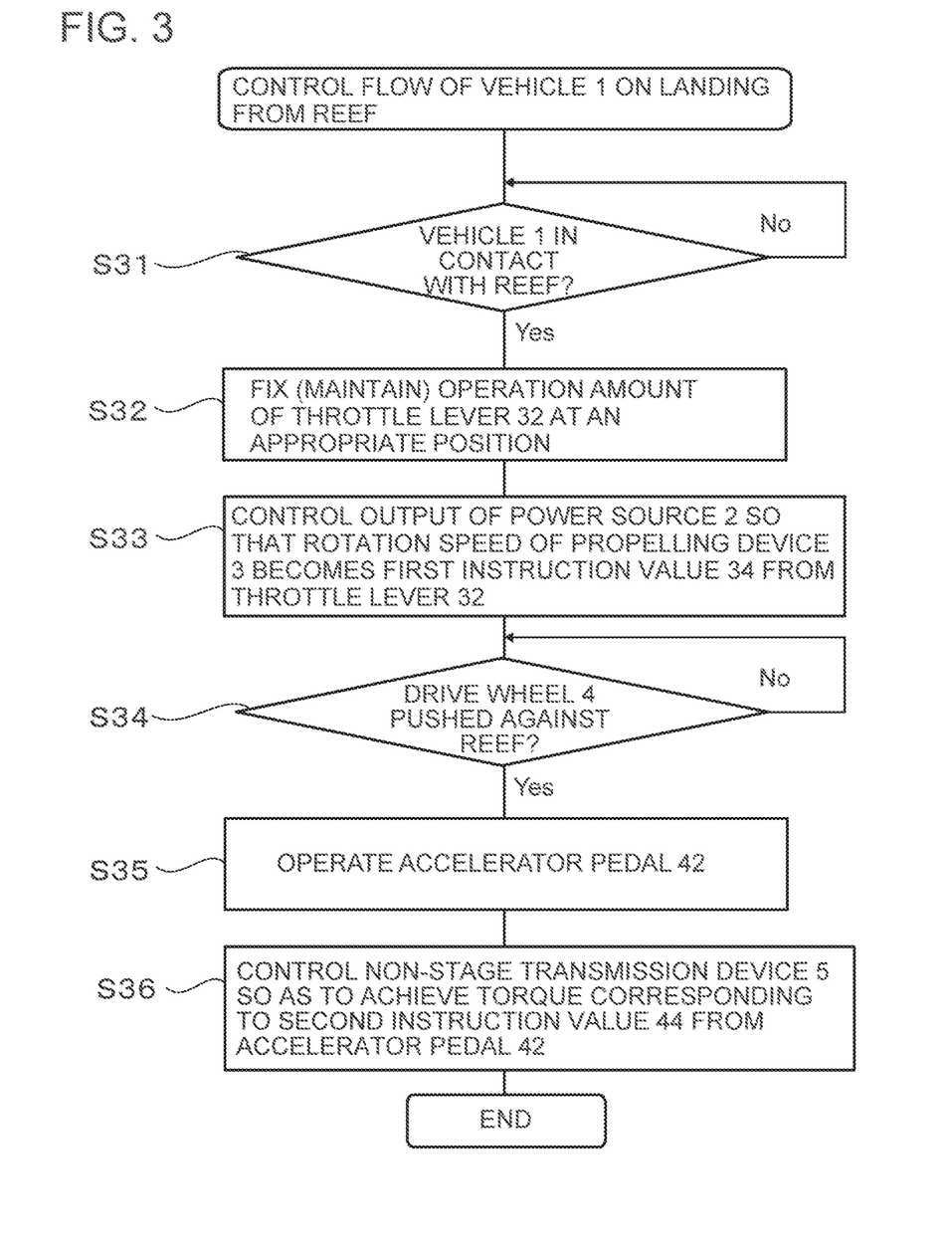
FIG. 3 is a diagram showing a control flow of a vehicle according to an embodiment at the time of making a landing from a reef.

Accordingly, in the vehicle 1 traveling on water surface 101 as shown in FIG. 2, it is possible to perform a control as shown in FIG. 3, and to make a landing even on a landscape that is typically difficult to land, such as the reef 102. That is, in the example shown in FIG. 2, the amphibious vehicle 1 (vehicle 1 shown by dotted line) traveling on the water surface 101 with the propelling device 3 is about to make a landing from the reef 102, and thus is in contact with the reef 102 (vehicle 1 shown by solid line). Furthermore, when landing onto the reef 102, the vehicle 1 is configured such that propelling by the propelling device 3 and the drive wheel 4 is possible. In the example shown in FIG. 2, the propelling device 3 of the vehicle 1 traveling on water is rotating in the clockwise rotational direction 36, for instance. In a situation of making a landing, the propelling device 3 and the drive wheel 4 are rotating in the clockwise rotational direction 46.

Figure 4A:
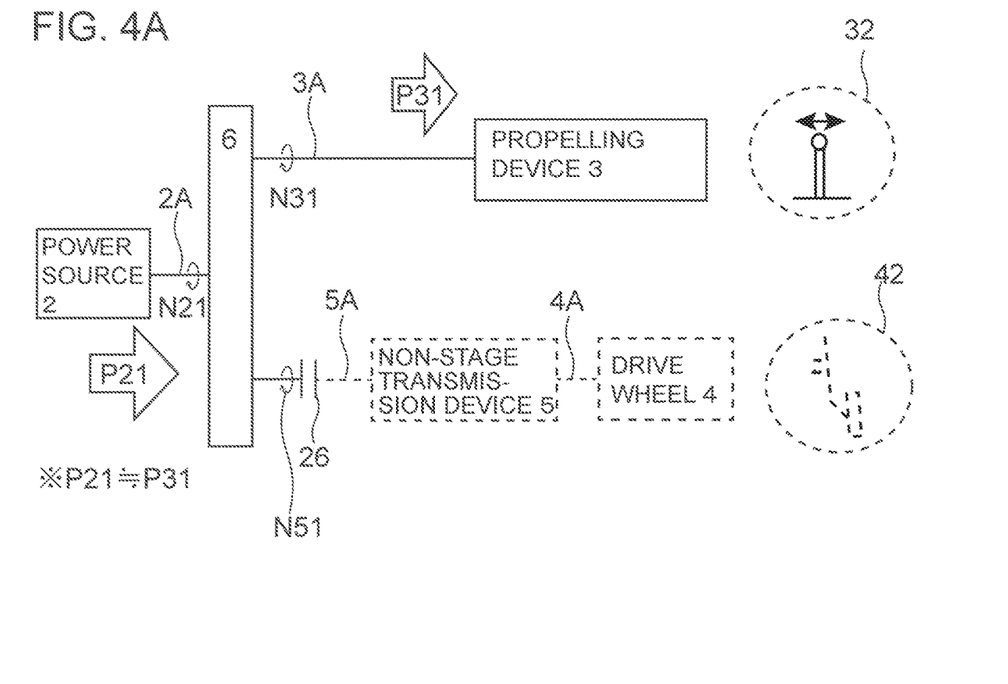
FIG. 4A is a diagram showing power transmission by a control device according to an embodiment of the present invention at the time of landing of a vehicle, where the vehicle is traveling on water before an accelerator pedal is operated.

In a situation where the vehicle 1 is making a landing, as shown in FIG. 4A for example, to reach a landing point (reef 102), the vehicle 1 travels on the water surface 101 while controlling the output of the power source 2 on the basis of the first instruction value 34 from the throttle lever 32 (No in step S31 in FIG. 3). Furthermore, the accelerator pedal 42 is not operated, and thus the second instruction value 44 is not input to the control device 9, or a value indicating zero operation amount of the accelerator pedal 42 is input. At this time, power transmission to the drive wheel 4 is shut off by a clutch device 26, and thus a load on the side of the drive wheel 4 (power transmission such as the gear 64) at the power distribution device 6 is extremely small. The output (P21) from the power source 2 is used as a distribution output (P31) for driving the propelling device 3 (P21≈P31). Furthermore, provided that the rotation speed of the output shaft 2A of the power source 2 is N21, the rotation speed N31 of the input shaft 3A of the propelling device 3 is N31=N21×(a predetermined transmission rate).

Furthermore, in step S31 of FIG. 3, when the vehicle 1 makes contact with the reef 102, which is a landing point, the operation amount of the throttle lever 32 is fixed (maintained) to an appropriate position in step S32. The throttle lever 32 is operated by an operator. Specifically, when the vehicle 1 makes contact with the reef 102, the output is increased with the throttle lever 32 to push the vehicle 1 against the reef 102. As the output is increased, the vehicle 1 is pushed hard against the reef 102, and the throttle lever 32 is fixed when the vehicle 1 does no longer move forward or backward. Further, in step S33, as the corresponding first instruction value 34 is input by fixing the throttle lever 32, the control device 9 controls the output of the power source 2 on the basis of the first instruction value 34. The output of the power source 2 by this control may be greater than the output P21 at the time of propelling on water as described above, or not greater than the output P21. In the following description, the output of the power source 2 is controlled to be P21 by operation of the throttle lever 32 in step S32. Accordingly, the rotation speed corresponding to the first instruction value 34 is controlled to be maintained at the input shaft 3A of the propelling device 3, and the vehicle 1 is pushed against the reef 102.

In step S32, it is determined whether the drive wheel 4 is pushed against the reef 102. This determination in step S34 may be performed on the basis of whether the rotational speed of the propelling device 3 or the input shaft 3A is substantially constant. Further, if it is determined that the drive wheel 4 is pushed against the reef 102, the process advances to the next step S35.

Figure 4B:
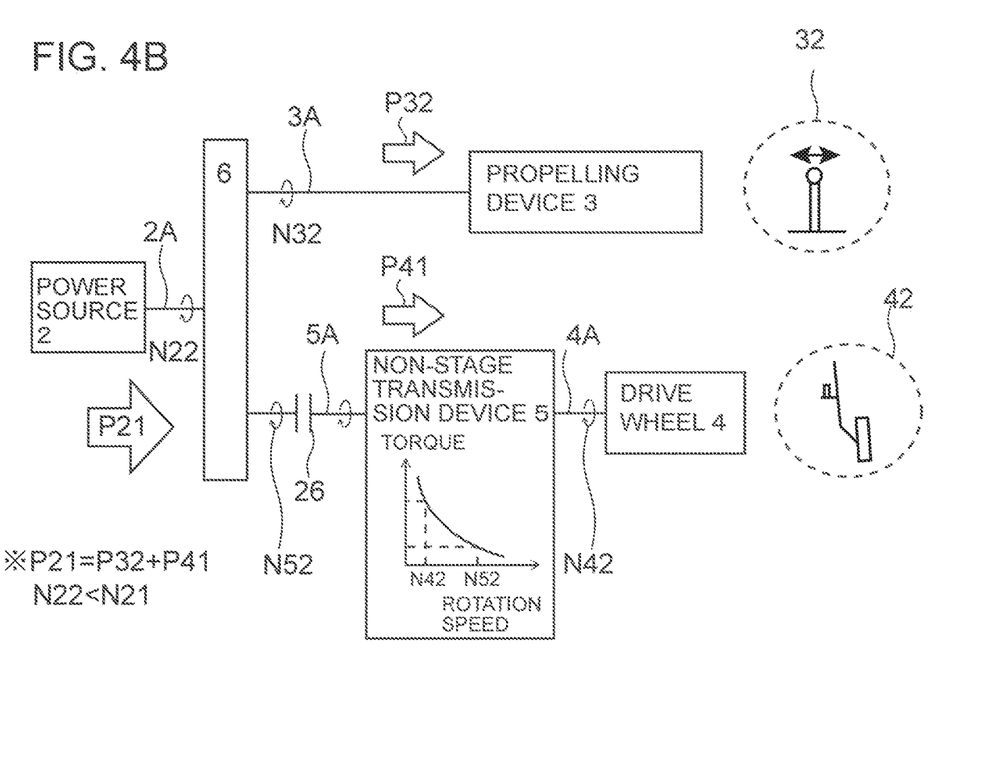
FIG. 4B is a diagram showing power transmission by a control device according to an embodiment of the present invention at the time of landing of a vehicle, where an accelerator pedal is operated (transition period).

In step S35, the accelerator pedal 42 is operated (step-in operation) while the vehicle 1 is pushed against the reef 102 by the propelling device 3. At this time, as shown in FIG. 4B, the clutch device 26 is connected such that the output from the power source 2 is transmitted toward the drive wheel 4. Furthermore, the non-stage transmission device 5 is disposed between the clutch device 26 and the drive wheel 4 to prevent a rapid increase of a load on the power source 2 at the time of connection (fastening) of the clutch device 26. Furthermore, in step S36, the non-stage transmission device 5 is controlled so that a torque based on the second instruction value 44 from the accelerator pedal 42 is generated at the drive wheel 4. For instance, in a case where torque-up is instructed by operation of the accelerator pedal 42, while the torque is increased, the rotation speed (N42) of the input shaft 4A of the drive wheel 4 becomes smaller than the rotation speed (N52) of the input shaft 5A of the non-stage transmission device 5.

Furthermore, in response to operation of the accelerator pedal 42, as shown in FIG. 4B, the power distribution device 6 divides the output into the distribution output P32 for the propelling device 3 and the distribution output P41 for the drive wheel 4, so as to rotate the input shaft 3A of the propelling device 3 and the input shaft 5A of the non-stage transmission device 5 in accordance with the respective reduction ratios with the output (P22) from the power source 2. At this time, due to connection of the clutch device 26, a load by the drive wheel 4 is applied to the output of the power source 2 in addition to the load by the propelling device 3, which causes reduction of the rotational speed of the output shaft 2A of the power source 2 from N21 to N22 (N21>N22). Furthermore, the reduction of the rotation speed of the output shaft 2A of the power source 2 causes reduction of the rotation speed of the input shaft 3A of the propelling device 3, which is coupled to the output shaft 2A of the power source 2 at a predetermined reduction ratio, from N31 to N32. In other words, when connecting the clutch device 26, the output of the power source 2 (P21) is divided into the output P32 (P31>P32) for the propelling device 3 and the output P41 for the drive wheel 4, and the distribution output P32 for the propelling device 3 becomes smaller than the output P31 before connection of the clutch device 26. The load by the propelling device 3 is substantially constant, and thus the rotation speed N32 of the input shaft 3A of the propelling device 3 becomes smaller than N31 (N31>N32).

Figure 4C:
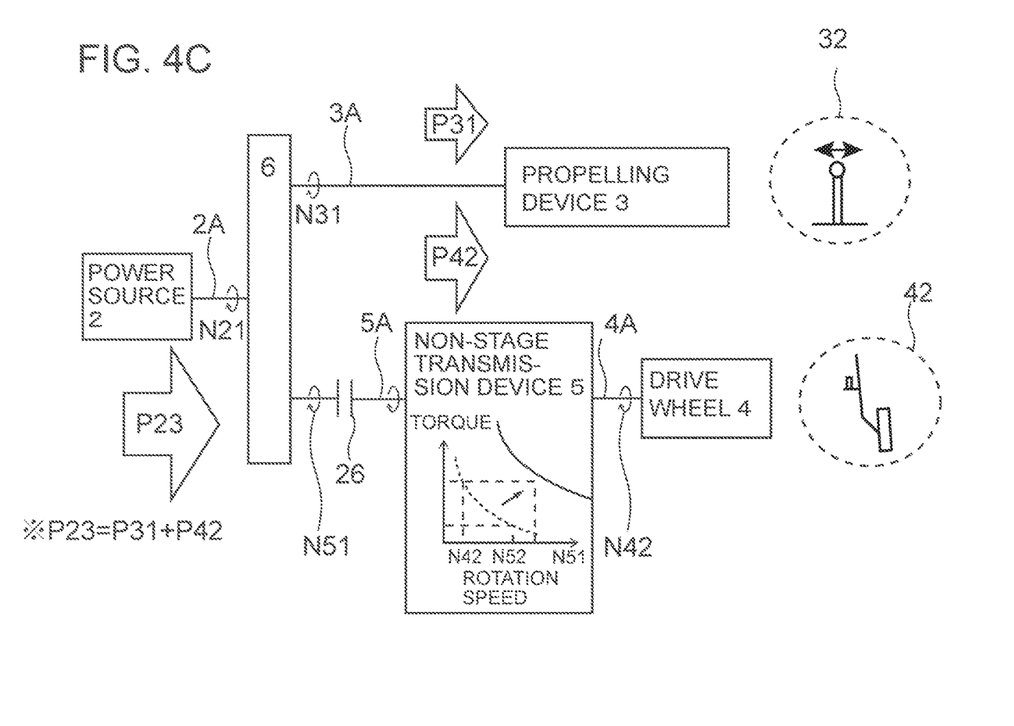
FIG. 4C is a diagram showing power transmission by a control device according to an embodiment of the present invention at the time of landing of a vehicle.

As described above, while the rotation speed of the input shaft 3A of the propelling device 3 is reduced by connection (fastening) of the clutch device 26, the rotation speed of the input shaft 3A of the propelling device 3 is controlled to be the first instruction value 34 from the throttle lever 32 as shown in FIG. 4C. Thus, the output of the power source 2 is increased (P23) (P23>P22), and thus the distribution output for the propelling device 3 is maintained at the distribution output (P31) before fastening of the clutch device 26, and the distribution output for the drive wheel 4 is increased from P41 to P42. Herein, the ratio of the rotation speed in FIGS. 4A to 4C is constant (N21:N31:N51=N22:N32:N52).

That is, in a case where the accelerator pedal 42 is operated to control (increase) the transmission ratio of the non-stage transmission device 5 while the first instruction value 34 is outputted from the throttle lever 32, if the rotation speed of the input shaft 5A of the non-stage transmission device 5 accordingly changes (decreases), the rotation speed of the input shaft 3A of the propelling device 3 coupled to the input shaft 5A of the non-stage transmission device 5 via the power distribution device 6 also might change (decrease). Even in this case, the output of the power source 2 is controlled so that the rotation speed of the input shaft 3A of the propelling device 3 becomes the rotation speed corresponding to the first instruction value 34, and thereby the output of the power source 2 changes (increases) to cover the change (decrease) in the rotation speed of the input shaft 4A of the propelling device 3, while the change (increase) in the output of the power source 2 is transmitted to the drive wheel 4 via the non-stage transmission 5 as a torque (traction) corresponding to the second instruction value 44.

Thus, even on a landscape which is typically difficult to land on, such as rocks and reefs, it is possible to drive the vehicle 1 to get over a rock or a reef by operating the accelerator pedal 42 to increase the torque (traction) of the drive wheel 4 gradually, while pushing the vehicle 1 against the rock or reef with a predetermined propelling force with the water propelling device 3 by operating the throttle lever 32.

In some embodiments, the control device 9 maintains the rotation speed of the input shaft 3A of the propelling device 3 by receiving feedback of the actual rotation speed of the input shaft 3A of the propelling device 3.

That is, the vehicle 1 includes a rotation speed detection device 22 capable of detecting the rotation speed of the input shaft 3A of the propelling device 3, which monitors the rotation speed, and inputs the detection result to the control device 9. Furthermore, the control device 9 compares a demand rotation speed based on the first instruction value 34 corresponding to the operation amount of the throttle lever 32 to an actual rotation speed, and thereby controls the output of the power source 2 so that the demand rotation speed and the actual rotation speed become equal. While the rotation speed detection device 22 is disposed in the vicinity of the input shaft 3A of the propelling device 3 in the example shown in FIG. 1, in another embodiment, the rotation speed detection device 22 may be disposed in the vicinity of the propelling device 3, the power distribution device 6, or the output shaft 2A of the power source 2. The rotation speed detection device 22 may calculate (estimate) the rotation speed from a measurement value taking into account the reduction ratio, for instance.

With this configuration, the output of the power source 2 is controlled in accordance with the feedback of the actual rotation speed from the rotation speed detection device 22, and thus it is possible to drive the propelling device 3 so as to follow the demand rotation speed.

Furthermore, in some embodiments, the control device 9 controls the non-stage transmission device 5 by receiving feedback of the actual torque of the input shaft 4A of the drive wheel 4.

That is, the vehicle 1 includes a torque detection device 24 capable of detecting the actual torque of the drive wheel 4. The torque detection device 24 monitors the actual torque, and inputs the detection result to the control device 9. Furthermore, the control device 9 compares a demand torque based on the second instruction value 44 corresponding to the operation amount of the accelerator pedal 42 to the actual torque, and thereby controls the transmission rate of the non-stage transmission device 5 so that the demand torque and the actual torque become equal. While the torque detection device 24 is disposed in the vicinity of the input shaft 4A of the drive wheel 4 in the example shown in FIG. 1, in another embodiment, the rotation speed detection device 22 may be disposed on the drive wheel 4.

With this configuration, the transmission ratio of the non-stage transmission device 5 is controlled in accordance with the feedback of the actual torque from the torque detection device 24, and thus it is possible to drive the drive wheel 4 so as to follow the demand torque.

Furthermore, in some embodiments, the control device 9 includes a torque map showing the relationship between the second instruction value 44 outputted from the accelerator pedal 42 and the demand torque, and is configured to obtain the demand torque corresponding to the second instruction value 44 on the basis of the torque map.

That is, when the second instruction value 44 is inputted from the accelerator pedal 42, the torque control part 9C refers to the torque map by using the second instruction value 44, and obtains a demand torque associated with the second instruction value 44. The torque map may be stored in a memory of the control device 9, in the form of either a table or a mathematical expression.

With this configuration, it is possible to associate the second instruction value 44 with the demand torque through the torque map, and thus it is possible to generate a desired torque corresponding to the operation amount of the accelerator pedal 42 at the drive wheel 4.

Figure 5:
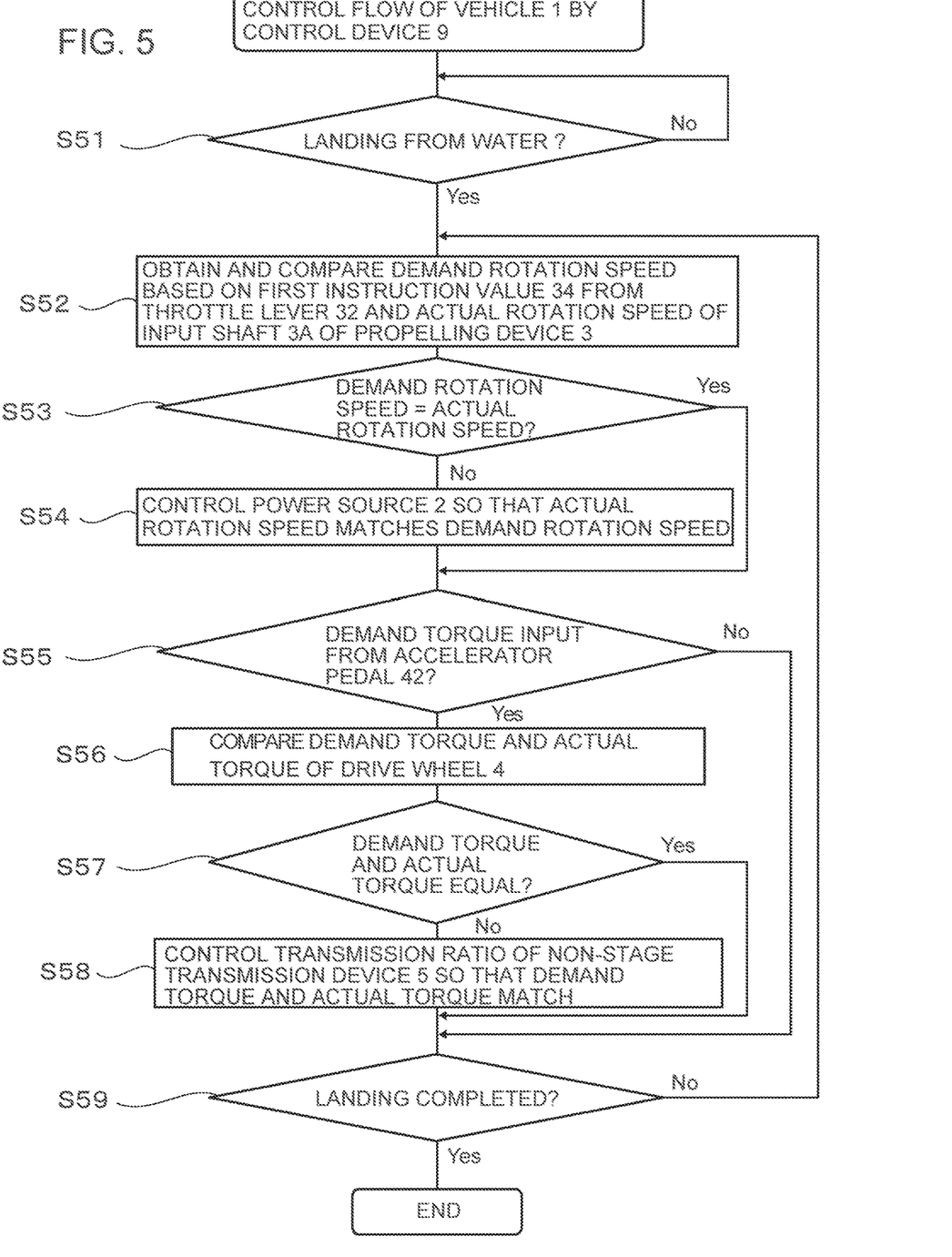
FIG. 5 is a diagram showing a control flow of a vehicle by a control device according to an embodiment of the present invention.

FIG. 5 shows a control flow of the control device 9, in a case where both of the actual rotation speed feedback control and the actual torque feedback control are applied to the vehicle 1, in some embodiments.

In step S51, if the control device 9 determines that the vehicle 1 is about to make a landing from the water surface 101, a rotation speed feedback control is performed (S52 to S54). That is, in step S52, the rotation speed control part 9B obtains a demand rotation speed based on the first instruction value 34 from the throttle lever 32 and the actual rotation speed of the input shaft 3A of the propelling device 3, and compares the demand rotation speed and the actual rotation speed. In step S53, it is determined whether the demand rotation speed and the actual rotation speed are equal. If not, a control parameter such as a fuel injection amount is determined in step S54, for controlling the output of the power source 2 so that the demand rotation speed and the actual rotation speed become equal. Then, the determined control parameter is transmitted to the output control part 9A, and is used for the output control of the power source 2 by the output control part 9A. On the other hand, if it is determined that the demand rotation speed and the actual rotation speed are equal in step S53, the process of step S53 is skipped, and the control on the power source 2 remains unchanged.

Subsequently, a torque feedback control is performed (S55 to S58). That is, a demand torque based on the second instruction value 44 from the accelerator pedal 42 is obtained in step S55, and then the demand torque and the actual torque of the drive wheel 4 are compared in step S56. In this determination, the demand torque may be obtained by referring to the torque map on the basis of the second instruction value 44. Then, if it is determined that the demand torque and the actual torque are not equal in step S57, the torque control part 9C determines the transmission ratio for the non-stage transmission device 5 so that the demand torque and the actual torque become equal, and the determined transmission rate is set for the non-stage transmission device 5. On the other hand, if it is determined that the demand torque and the actual torque are equal in step S57, step S58 is skipped, and the transmission ratio of the non-stage transmission device 5 remains unchanged.

Then, in step S59, it is determined whether landing is completed. If not, the process returns to step S52, and the rotation speed feedback control and the torque feedback control are repeated again. If it is determined that landing is completed in step S59, the process is ended.

The above rotation speed feedback control and the torque feedback control may be performed periodically, or may be performed in response to a change in the first instruction value from the throttle lever 32 or the second instruction value 44 from the accelerator pedal 42. Furthermore, while the rotation speed feedback control and the torque feedback control are performed in this order in the example shown in FIG. 5, the two controls may be performed in parallel. Furthermore, when determining the equality, the demand rotation speed and the actual rotation speed, or the demand torque and the actual torque may not necessarily be strictly equal. The determination may be performed with a margin. For instance, it may be determined that the demand torque and the actual torque are equal if a difference therebetween is within a predetermined range.

In some embodiments, the vehicle 1 includes a clutch device 26 disposed on the input shaft 5A of the non-stage transmission device 5, and is capable of connecting and separating the power distribution device 6 and the non-stage transmission device 5. The clutch device 26 is connected when it is necessary to transmit the output from the power source 2 to the drive wheel 4, and otherwise separated.

In some embodiments, connection and separation of the clutch device 26 is controlled on the basis of the operation amount of the accelerator pedal 42, in a situation where it is necessary to control the non-stage transmission device 5 with the accelerator pedal 42.

That is, in a specific operation situation such as landing of the vehicle 1, the clutch device 26 operates so that the power distribution device 6 and the non-stage transmission device 5 are separated and power transmission is shut off, if the second instruction value 44 outputted from the accelerator pedal 42 is not greater than a predetermined value. In other words, the power distribution device 6 and the drive wheel 4 are not coupled. On the other hand, if the second instruction value 44 outputted from the accelerator pedal 42 is greater than a predetermined value, the clutch device 26 operates so that the power distribution device 6 and the non-stage transmission device 5 are connected.

With this configuration, power transmission is connected between the power distribution device 6 and the non-stage transmission device 5 only if the second instruction value 44 is greater than a predetermined value. If the second instruction value 44 is not greater than a predetermined value, power transmission is shut off between the power distribution device 6 and the non-stage transmission device 5, and the entire output of the power source 2 is transmitted to the propelling device 3. Thus, it is possible to prevent transmission of a predetermined power to the drive wheel 4 when the demand torque of the drive wheel 4 is zero, for instance, and thereby it is possible to make effective use of the output of the power source 2, such as improving fuel consumption.

While the above described amphibious vehicle 1 includes the propelling device 3 as the first drive device 3 and the drive wheel 4 as the second drive device 4, the vehicle 1 may be a vehicle configured to run over a step or an obstacle by controlling torque of the second drive device 4 with the second instruction device 42 while maintaining a constant rotation speed for the first drive device 3 with the first instruction device 32. Furthermore, the first drive device 3 and the second drive device 4 may be each a drive device selected from a water jet, a propeller, a crawler belt, a tire, a loading device (crane, winch, folk, etc.) capable of lifting and lowering a load, a track box provided for a vehicle, or a loading platform device (tipper, mixer, etc.) capable of tilting or rotating a loading platform or a mixing drum. The reef 102 is merely an example, and may be another obstacle that impairs traveling, such as a step and an object. Furthermore, the first instruction value 34 and the second instruction value 44 may be outputted by an operator operating the instruction devices (32, 42), or may be automated by software control.

Figure 6:
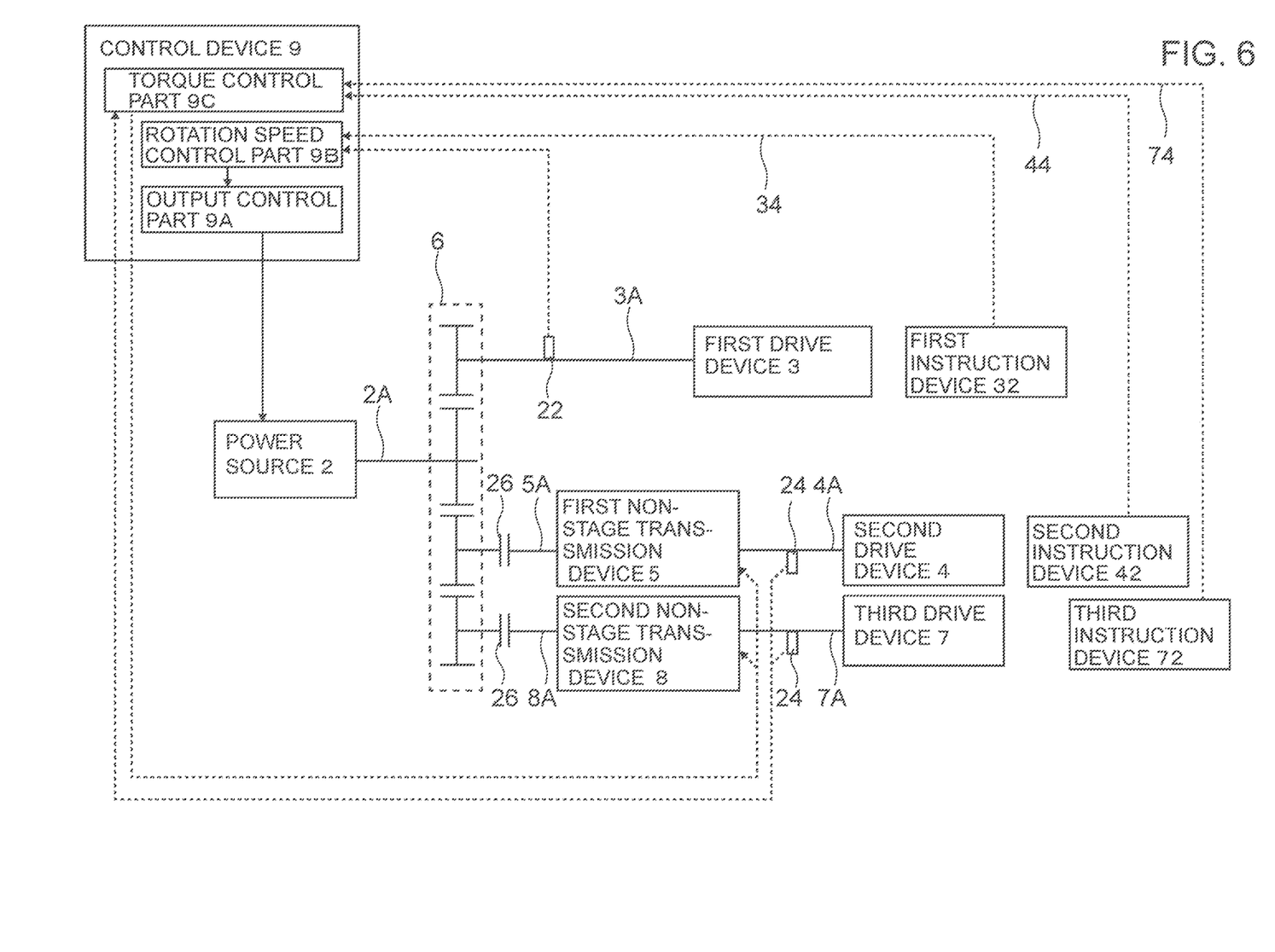
FIG. 6 is a schematic configuration diagram of a vehicle including three or more drive devices, according to an embodiment of the present invention.

In another embodiment, as shown in FIG. 6, the vehicle 1 includes a power source 2, and three or more drive devices (in FIG. 6, three: the first drive device 3, the second drive device 4, and the third drive device 7). The output from the power source 2 is transmitted to all of the drive devices 4 by the power transmission device 3, and each drive device is driven by the output from the power source 2. The power transmission device includes non-stage transmissions 5, 8, a power distribution device 6, and a plurality of drive shafts (2A, 3A, 4A, 5A, 7A, 8A). Furthermore, the vehicle 1 includes a control device 9 and a plurality of instruction devices that input an instruction value to each of the drive devices (3, 4, 7) (in FIG. 6, three: the first instruction device 32, the second instruction device 42, the third instruction device 72), which control the output of the power source 2. Herein, the same configuration as that shown in FIG. 1 will not be described in detail again, such as the control device 9, the power source 2, the output shaft 2A thereof, and the non-stage transmissions (5, 8).

In the embodiment shown in FIG. 6, the power distribution device 6 is configured to distribute the output of the power source 2 to the three drive devices including the first drive device 3, the second drive device 4, and the third drive device 7. That is, the input shaft 3A of the first drive device 3 is directly coupled to the power distribution device 6. Furthermore, the second drive device 4 and the third drive device 7 are coupled to the power distribution device 6 via the first non-stage transmission device 5 and the second non-stage transmission device 8, respectively. Specifically, the input shaft 4A of the second drive device 4 is coupled to the non-stage transmission device 5, and the input shaft 7A of the third drive device 7 is coupled to the second non-stage transmission device 8. Furthermore, the input shaft 5A of the first non-stage transmission device 5 and the input shaft 8A of the second non-stage transmission device 8 are coupled to the power distribution device 6.

Furthermore, the output shaft 2A of the power source 2 is coupled to the input shafts 3A, 5A, and 8A of the respective drive devices via the power distribution devices 6, in a state where respective predetermined reduction ratios are fixed.

With this configuration, the control device 9 controls the output of the power source 2 so that the rotation speed of the input shaft 3A of the first drive device 3 becomes equal to the first instruction value 34 from the first instruction device 32. Further, in such a situation, the control device 9 controls the transmission ratio of the corresponding non-stage transmission device so that a demand torque corresponding to the instruction value for another drive devices is generated. Specifically, the transmission ratio of the first non-stage transmission device 5 is controlled in accordance with the second instruction value 44 outputted from the second instruction device 42. Similarly, the transmission ratio of the second non-stage transmission device 8 is controlled in accordance with the third instruction value 74 outputted from the third instruction device 72. In other words, even in a case where a plurality of drive devices are provided, by coupling a non-stage transmission device to a drive device, and coupling the drive device to the power distribution device 6 via the non-stage transmission device, the output of each drive device is changed with the non-stage transmission device in a state where the output of the power source 2 is maintained to be constant.

With regard to the drive devices (3, 4, 7) shown in FIG. 6, the first drive device 3 may be a loading device (crane, winch, folk), or a loading platform device (tipper, mixer, etc.), and the second drive device 4 may be a crawler belt or a tire, and the third drive device 7 may be a water jet, a propeller, for instance. Furthermore, each of the drive devices (3, 4, 7) may be selected from the above examples.

Furthermore, while the number of drive devices is three in the example shown in FIG. 6, three or more drive devices may be coupled to the power distribution device 6 by coupling another drive device to the power distribution device 6 via another non-stage transmission. For instance, the fourth drive device may be coupled to the power distribution device 6 via the fourth non-stage transmission device. In the above configuration, the first drive device 3 may be a loading device, the second drive device 4 may be a crawler belt or a tire, the third drive device 7 may be a water jet, a propeller, and the fourth drive device may be a loading platform device, for instance. The clutch device 26 may be provided corresponding to each of non-stage transmission devices, or the torque detection device 24 may be provided for each drive device to perform the above described torque feedback control. The above described rotation speed feedback control may be performed on the first drive device 3.

With the above configuration, even in a case where a plurality of drive devices are provided, by coupling a non-stage transmission device to a drive device, and coupling the drive device via the power distribution device 6, it is possible to change the output of a drive device with the non-stage transmission in a state where the output of the power source 2 is maintained to be constant.

Embodiments of the present invention were described in detail above, but the present invention is not limited thereto, and various amendments and modifications may be implemented.

DESCRIPTION OF REFERENCE NUMERALS

1 Vehicle
2 Power source
2A Output shaft of power source
22 Rotation speed detection device
24 Torque detection device
26 Clutch device 3 Propelling device (first drive device)
32 Throttle lever (first instruction device)
34 First instruction value
36 Rotational direction of propelling device
3A Input shaft of propelling device (first drive device)
4 Drive wheel (second drive device)
42 Accelerator pedal (second instruction device)
44 Second instruction value
46 Rotational direction of drive wheel
4A Input shaft of drive wheel (second drive device)
5 Non-stage transmission device (first non-stage transmission device)
5A Input shaft of non-stage transmission device
6 Power distribution device
62 Gear
63 Gear
64 Gear
7 Third drive device
72 Third instruction device
74 Third instruction value
7A Input shaft of third drive device
8 Third non-stage transmission device
8A Input shaft of third non-stage transmission device
9 Control device
9A Output control part
9B Rotation speed control part
9C Torque control part
101 Water surface (sea)
102 Reef
C2 Gear teeth number
C3 Gear teeth number
C4 Gear teeth number
N21 Rotation speed of input shaft of power source
N22 Rotation speed of input shaft of power source
N31 Rotation speed of input shaft of propelling device
N32 Rotation speed of input shaft of propelling device
N41 Rotation speed of input shaft of drive wheel
N42 Rotation speed of input shaft of drive wheel
N51 Rotation speed of input shaft of non-stage transmission device
N52 Rotation speed of input shaft of non-stage transmission device
P21 Output from power source
P22 Output from power source
P23 Output from power source
P31 Distribution output to propelling device
P32 Distribution output to propelling device
P41 Distribution output to drive wheel
P42 Distribution output to drive wheel

The invention claimed is:

1. A vehicle, comprising:
a power source;
a first drive device configured to be driven by an output of the power source;
a second drive device configured to be driven by the output of the power source;
a non-stage transmission device capable of continuously changing a rotation speed which is transmitted to an input shaft of the second drive device;
a power distribution device coupled to an output shaft of the power source, coupled to an input shaft of the first drive device and an input shaft of the non-stage transmission device, and configured to be capable of distributing the output of the power source to the first drive device and the second drive device in a state where the output shaft of the power source is coupled to the input shaft of the first drive device and the input shaft of the non-stage transmission device at respective predetermined fixed reduction ratios;
a first instruction device configured to output a first instruction value related to a rotation speed of the input shaft of the first drive device;
a second instruction device configured to output a second instruction value related to a torque of the input shaft of the second drive device; and
a control device configured to be capable of controlling the output of the power source and a transmission ratio of the non-stage transmission device,
wherein the control device includes:
an output control part configured to control the output of the power source in accordance with the first instruction value outputted from the first instruction device; and
a transmission control part configured to control the transmission ratio of the non-stage transmission device in accordance with the second instruction value outputted from the second instruction device.

2. The vehicle according to claim 1,
further comprising a rotation speed detection device capable of detecting an actual rotation speed of the input shaft of the first drive device,
wherein the control device is configured to control the output of the power source so that the actual rotation speed detected by the rotation speed detection device becomes equal to a demand rotation speed corresponding to the first instruction value outputted from the first instruction device.

3. The vehicle according to claim 1,
further comprising a torque detection device capable of detecting an actual torque of the input shaft of the second drive device,
wherein the control device is configured to control a transmission ratio of the non-stage transmission device so that the actual torque detected by the torque detection device becomes equal to a demand torque corresponding to the second instruction value outputted from the second instruction device.

4. The vehicle according to claim 3,
wherein the control device has a torque map including a relationship between the demand torque and the second instruction value outputted from the second instruction device associated with each other, and is configured to obtain the demand torque corresponding to the second instruction value on the basis of the torque map.

5. The vehicle according to claim 1,
further comprising a clutch device disposed on the input shaft of the non-stage transmission device and configured to be capable of connecting and shutting off power transmission between the power distribution device and the non-stage transmission device,
wherein the clutch device is configured to:
operate so as to shut off the power transmission between the power distribution device and the non-stage transmission device if the second instruction value outputted from the second instruction device is not greater than a predetermined value, and
operate so as to connect the power transmission between the power distribution device and the non-stage transmission device if the second instruction value outputted from the second instruction device is greater than the predetermined value.

6. The vehicle according to claim 1,
wherein the first drive device and the second drive device each comprise a drive device for applying a propelling force to the vehicle.

7. The vehicle according to claim 6,
wherein the first drive device comprises a water propelling device configured to apply a propelling force to the vehicle on water, and
wherein the second drive device comprises a drive wheel configured to rotate while being in contact with ground to apply a propelling force to the vehicle.

8. The vehicle according to claim 1, further comprising:
a third drive device configured to be driven by the output of the power source;
a second non-stage transmission device capable of continuously changing a rotation speed which is transmitted to an input shaft of the third drive device; and
a third instruction device configured to output a third instruction value related to a rotation speed of the input shaft of the third drive device,
wherein the power distribution device is coupled to the output shaft of the power source, coupled to the input shaft of the first drive device, the input shaft of the non-stage transmission device, and the input shaft of the third drive device, and configured to be capable of distributing the output of the power source to the first drive device, the second drive device, and the third drive device in a state where the output shaft of the power source is coupled to the input shaft of the first drive device, the input shaft of the non-stage transmission device, and the input shaft of the third drive device at respective predetermined fixed reduction ratios, and
wherein the control device further includes a second transmission control part configured to control a transmission ratio of the second non-stage transmission device in accordance with the third instruction value outputted from the third instruction device.

9. The vehicle according to claim 8,
wherein at least one of the first drive device, the second drive device, or the third drive device comprises a loading device configured to be capable of lifting and lowering a load, or a loading platform device configured to be capable of tilting or rotating a loading platform or a mixing drum mounted to the vehicle.

* * * * *